(12) United States Patent
Matsubara et al.

(10) Patent No.: US 7,932,954 B2
(45) Date of Patent: Apr. 26, 2011

(54) CROSS COLOR AND DOT DISTURBANCE ELIMINATION APPARATUS AND METHOD

(75) Inventors: Shogo Matsubara, Musashino (JP); Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1274 days.

(21) Appl. No.: 11/512,092

(22) Filed: Aug. 30, 2006

(65) Prior Publication Data
US 2007/0052860 A1 Mar. 8, 2007

(30) Foreign Application Priority Data
Aug. 31, 2005 (JP) .................. 2005-251040

(51) Int. Cl.
*H04N 9/64* (2006.01)
(52) U.S. Cl. .................................................. 348/609
(58) Field of Classification Search .................. None
See application file for complete search history.

(56) References Cited

U.S. PATENT DOCUMENTS

| | | | | |
|---|---|---|---|---|
| 4,530,004 A * | 7/1985 | Achiha et al. | ........... | 348/450 |
| 5,019,895 A * | 5/1991 | Yamamoto et al. | ........... | 348/609 |
| 5,027,194 A * | 6/1991 | Scheffler | ........... | 348/609 |
| 5,305,120 A * | 4/1994 | Faroudja | ........... | 348/624 |
| 5,448,305 A * | 9/1995 | Hagino | ........... | 348/665 |
| 5,483,294 A * | 1/1996 | Kays | ........... | 348/609 |
| 7,271,850 B2 * | 9/2007 | Chao | ........... | 348/609 |
| 7,280,159 B2 * | 10/2007 | Chao | ........... | 348/609 |
| 7,336,321 B2 * | 2/2008 | Suzuki et al. | ........... | 348/663 |
| 7,460,180 B2 * | 12/2008 | Chao | ........... | 348/624 |
| 7,634,132 B2 * | 12/2009 | Chao | ........... | 382/162 |
| 7,697,075 B2 * | 4/2010 | Zhu | ........... | 348/609 |
| 2002/0113900 A1 | 8/2002 | Kondo et al. | | |
| 2005/0168650 A1 * | 8/2005 | Walls et al. | ........... | 348/666 |
| 2005/0253967 A1 * | 11/2005 | Yoshida | ........... | 348/556 |

FOREIGN PATENT DOCUMENTS

| | | |
|---|---|---|
| JP | 3186336 | 5/2001 |
| JP | 2003-143439 | 5/2003 |
| JP | 2003-153284 | 5/2003 |
| JP | 2004-40291 | 2/2004 |
| JP | 2004-128936 | 4/2004 |
| JP | 2004-289753 | 10/2004 |
| JP | 2005-130237 | 5/2005 |

OTHER PUBLICATIONS

Notification of Reasons for Rejection for Application No. 2005-251040, Japanese Patent Office, mailed Oct. 16, 2007.

* cited by examiner

*Primary Examiner* — Paulos M Natnael
(74) *Attorney, Agent, or Firm* — Finnegan, Henderson, Farabow, Garrett & Dunner, L.L.P.

(57) ABSTRACT

According to one embodiment, an apparatus includes an average calculation portion which performs a average calculating process between frames by use of an input signal and one-frame delay signal and acquires an output signal having cross color and dot disturbance components reduced, and an up-convert signal detecting portion which sets the inter-frame mean delay processing portion into an operative state when the input signal is an up-convert signal obtained by up-converting a low-resolution signal into a high-resolution signal.

8 Claims, 6 Drawing Sheets

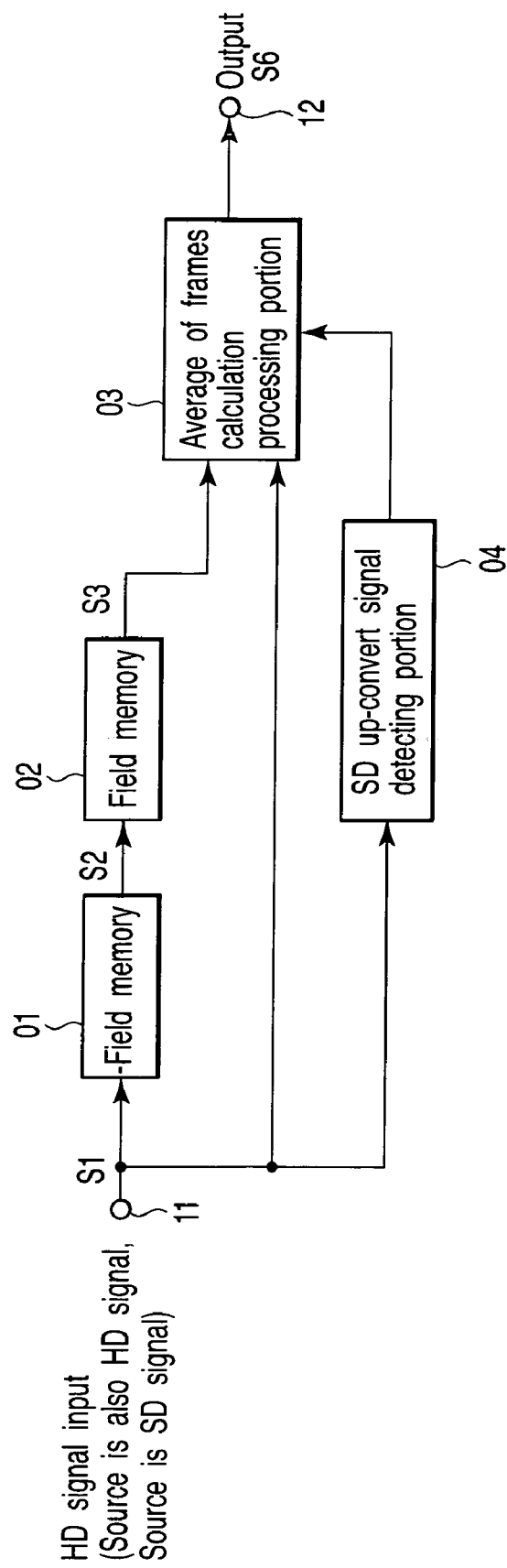
F I G. 1

CROSS COLOR AND DOT DISTURBANCE ELIMINATION APPARATUS AND METHOD

CROSS-REFERENCE TO RELATED APPLICATIONS

This application is based upon and claims the benefit of priority from Japanese Patent Application No. 2005-251040, filed Aug. 31, 2005, the entire contents of which are incorporated herein by reference.

BACKGROUND

1. Field

One embodiment of the invention relates to a cross color and dot disturbance elimination apparatus and method and more particularly to an apparatus and method which are effective when a high definition (HD) signal is received as a video signal. More specifically, whether the received HD signal is a signal which is an original HD signal generated from the source or a signal obtained by, for example, converting a standard signal (SD) into an HD signal is determined. Then, an adaptive cross color and dot disturbance eliminating operation is attained according to the result of determination.

2. Description of the Related Art

When a color video signal is transmitted, a color signal and luminance signal are separately modulated by use of different frequencies, then synthesized and transmitted as a decoded video signal. Therefore, on the receiver side, a modulation color signal is separated from the decoded video signal by use of a filter and a modulated luminance signal is extracted by subtracting the separated modulation color signal from the decoded video signal. In this case, it is known that a high-frequency component of the luminance signal remains in the separated modulation color signal according to a picture pattern in some cases. Such a high-frequency component is called cross color disturbance or dot disturbance.

In order to eliminate the above cross color and dot disturbances, for example, the techniques described in Patent Documents 1 (Jpn. Pat. Appln. KOKAI Publication No. 2004-128936), 2 (Patent Specification No. 3186336), 3 (Jpn. Pat. Appln. KOKAI Publication No. 2004-040291) are provided.

Recently, an image compression coding technique is developed and a receiver apparatus or recording/reproducing apparatus which receives a high definition (HD) signal subjected to a compression coding process from a broadcasting station or recording medium is developed. However, the received HD signal is not always an HD signal originally generated from the source. It is obtained by converting a standard signal (SD) into the HD signal in some cases (for example, Patent Document 4 ((Jpn. Pat. Appln. KOKAI Publication No. 2004-289753)).

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary and basically block diagram showing the configuration of an embodiment of the invention.

DETAILED DESCRIPTION

Figure 2:
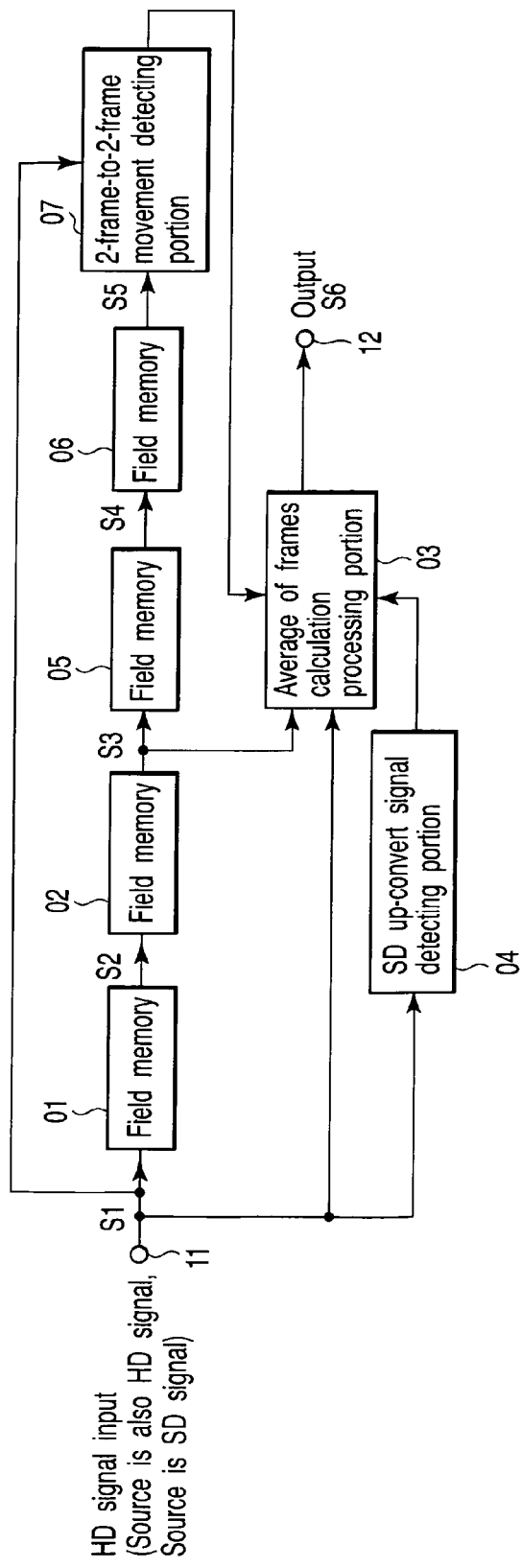
FIG. 2 is a configuration explanatory diagram concretely showing one embodiment of the invention.

Various embodiments according to the invention will be described hereinafter with reference to the accompanying drawings.

The inventors and others paid much attention to the fact that the cross color and dot disturbances often occurred when a signal obtained by converting a standard (SD) signal or a signal having originally low resolution (having resolution lower than that of an HD signal) into an HD signal was reproduced. One embodiment of this invention is to provide a cross color and dot disturbance eliminating apparatus and method which perform the adequate cross color and dot disturbance eliminating operation when a signal obtained by converting the standard (SD) signal into an HD signal is supplied thereto.

Further, another embodiment is to provide a cross color and dot disturbance eliminating apparatus and method which attain the above adequate cross color and dot disturbance eliminating operation together with the detection result of movement of an image.

In one embodiment, an average of frames calculation processing portion which performs a average calculation process for frames by use of an input signal and a one-frame delay signal to obtain an output signal having cross color and dot disturbance components reduced, and an up-convert signal detecting portion which sets the average of frame calculation processing portion into an operative state when the input signal is an up-convert signal obtained by up-converting a signal of a first resolution into a signal of a second resolution higher than the first resolution are provided. As a result, when a signal in which the cross color and dot disturbances tend to often occur has arrived, an adequate cross color and dot disturbance eliminating operation can be performed.

There will now be described embodiments of this invention with reference to the drawings. FIG. 1 shows a basic configuration. An HD signal (luminance and color signal) is input to an input terminal 10. The HD signal (which is referred to as an input signal S1) is input to a series circuit of field memories 01, 02 and an SD up-convert signal detecting portion 04. An output signal S3 of the field memory 02 and the above input signal S1 are subjected to the operation process of {(S1+S3)/2} in an average of frames calculation processing portion 03. In this portion, the color signal and luminance signal are processed. Then, an output signal S6 is output to an output terminal 12.

The cross color component and dot disturbance component are set in opposite phases between one-frames. Therefore, if the cross color component and dot disturbance component are contained in the input signal S1 in the case of a still picture, the components are canceled in the average calculation processing portion 03.

Further, for example, attention is paid to the fact that relatively large amounts of cross color components and dot disturbance components are contained in an SD up-convert signal, that is, an up-convert signal obtained by converting a signal of a first resolution into a signal of a second resolution higher than the first resolution. Therefore, whether the input signal S1 is an SD up-convert signal or not is determined by use of the SD up-convert signal detecting portion 04. In this case, the SD up-convert signal detecting portion 04 may utilize only the luminance signal or utilize the luminance signal and color signal. The way to determine whether or not the input signal S1 is an SD up-convert signal is explained in detail later.

When the input signal S1 is an SD up-convert signal, the detecting portion 04 controls and causes the average of frames calculation processing portion 03 to perform the operation process of $\{(S1+S3)/2\}$. Thus, it becomes possible to effectively reduce the cross color components and dot disturbance components of relatively large amounts contained in the SD up-convert signal.

FIG. 2 more specifically shows the embodiment. That is, the signal S3 is further input to a series circuit of field memories 05, 06. The input signal S1 and an output signal S5 of the field memory 06 are input to a 2-frame-to-2-frame movement detecting portion 07. When a moving picture is input, the 2-frame-to-2-frame movement detecting portion 07 outputs an image movement detecting signal and suppresses the operation of the average calculation processing portion 03.

That is, the 2-frame-to-2-frame movement detecting portion 07 detects a movement amount α of an image as a movement detection signal and controls the operation of the average calculation processing portion 03 by use of the detected value based on the following equation.

$$S6=S1+\alpha\{(S3-S1)/2\}$$

In the case of a still picture, α=1 is defined and α varies according to the amount of movement of an image and varies, for example, from 1 to 0 in a stepwise fashion. As the image movement becomes larger, the percentage of the input signal in the output signal becomes larger.

If α is 1, the above equation can be rewritten as follows.

$$S6=\{(S1+S3)/2\}$$

If α is 0, S6=S1 can be attained.

When the SD up-convert signal is input from the SD up-convert signal detecting portion 04, the average calculation processing operation of the average of frames calculation processing portion 03 is basically set in the ON state. Then, the degree of the average calculation process is controlled based on the movement detection signal. Further, when an HD signal is input, the average calculation processing operation is basically set in the OFF state and the input passes through as it is.

Figure 3:
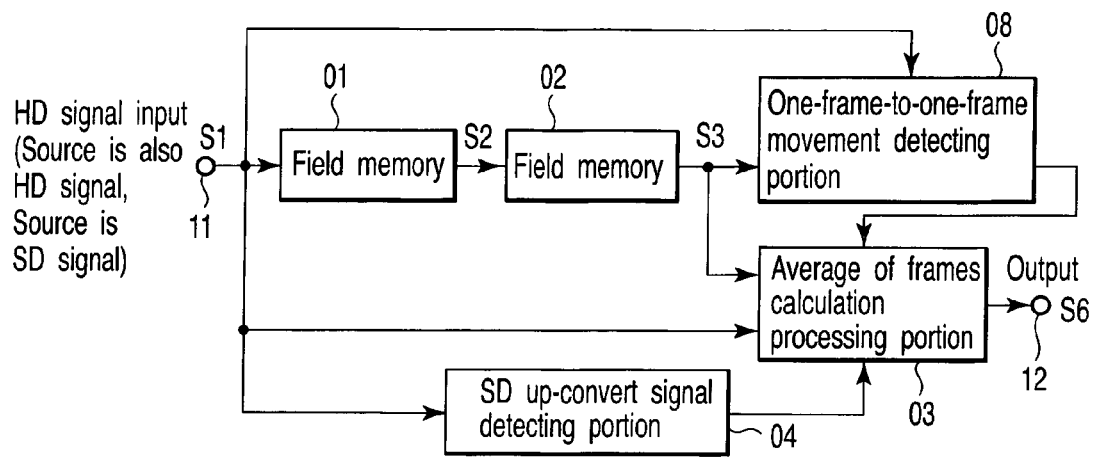
FIG. 3 is a configuration explanatory diagram showing another embodiment of the invention.

FIG. 3 shows another embodiment. Portions which are the same as those of FIG. 2 are denoted by the same reference symbols. In this example, the movement of an image is detected by checking a difference of the signals between one-frames in order to detect the movement of the image. For this purpose, an inter-frame movement detecting portion 08 is provided and determination of a moving picture or still picture is made based on a difference signal between the signal S3 and the input signal S1 to derive α. Since the other portions are the same as those in the embodiment shown in FIG. 2, portions which are the same as those of FIG. 3 are denoted by the same reference symbols and the explanation thereof is omitted.

Figure 4:
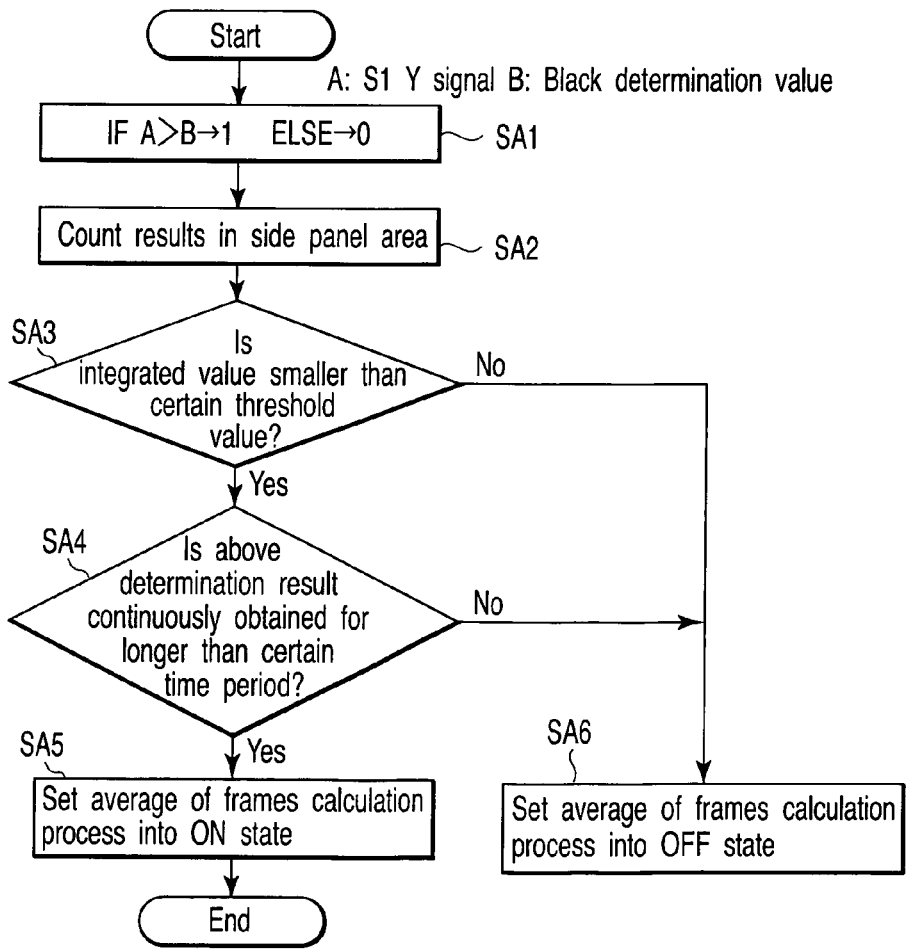
FIG. 4 is a flowchart for illustrating one example of a determination processing operation of an SD up-convert signal applied to the invention.

FIG. 4 is a flowchart for illustrating the operation of the SD up-convert signal detecting portion 04 when it determines whether the input signal is an SD up-convert signal or not.

In the SD up-conversion process, a side panel is added to compensate for an area which lacks in the SD signal at the time of SD→HD conversion and make a pseudo HD signal. Therefore, it becomes possible to determine whether the input signal is an SD up-convert signal or not by detecting the presence or absence of the side panel (method (1)). Alternatively, when the screen is enlarged at the time of SD→HD conversion, the SD up-convert signal is used only in a limited signal band on the low frequency side with respect to the frequency band of the HD signal. Based on the above fact, it becomes possible to determine whether the input signal is an SD up-convert signal or not by the input luminance (Y) signal frequency band detection process (method (2)). Further, the determination can be made by use of both of the above methods (1) and (2).

The example of FIG. 4 shows a first embodiment of the SD up-convert signal detection process. Whether the side panel is present or not is determined by determining the black level of a Y signal in the side panel area (step SA1). First, a threshold value B used to determine the black level is prepared, compared with a value A of the input signal S1, "1" is returned if the level is higher than the threshold value (in the case of A>B), and "0" is returned in the other cases.

The value is integrated by counting the result in the side panel area (step SA2). When the integrated value output is not larger than the threshold value, it is determined that the side panel area is a black level (step SA3). When the above determination is successively made over a plurality of fields for a period of time longer than a certain time period, it is determined that a side panel exists and the input signal is an SD up-convert signal (step SA4) and the average calculation process is set in the ON state (step SA5). In the other cases, the average calculation process is set in the OFF state (step SA6).

Figure 5:
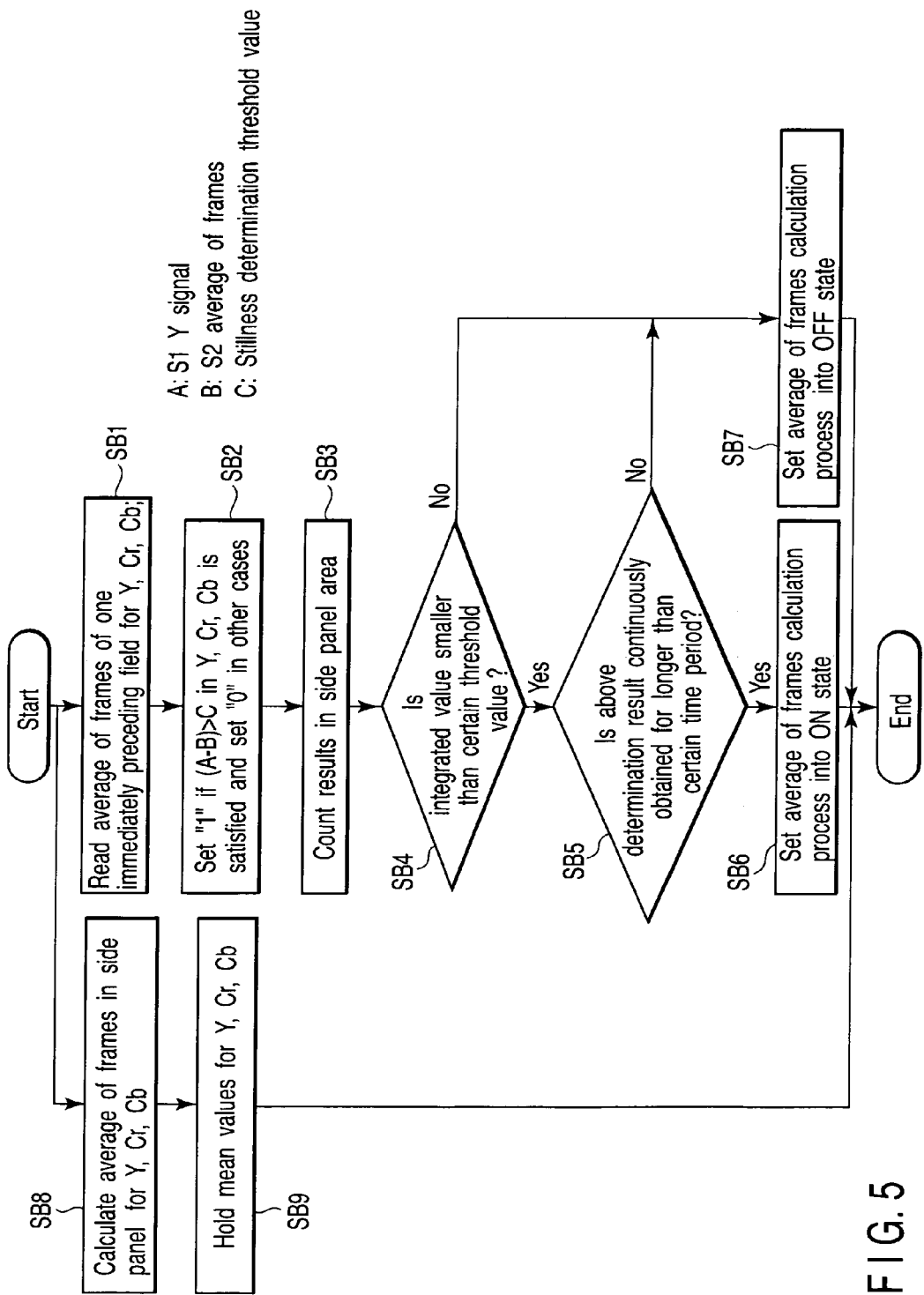
FIG. 5 is a flowchart for illustrating another example of a determination processing operation of an SD up-convert signal applied to the invention.

FIG. 5 shows a second embodiment of the SD up-convert signal detection process. In this example, the side panel is detected by determining that the luminance and color signal of the side panel area are uniformly kept stabilized for a continuous period of time. That is, it is determined that the luminance and color signal of the side panel area form a uniform still picture for a continuous period of time. First, average values of the luminance signal Y and color-difference signals Cr, Cb in the side panel area of the input signal S1 are derived (step SB8) and the values thereof are held (step SB9).

Then, the average of one immediately preceding field is read (step B1) and the difference between the average and the input signal S1 is derived for each of Y, Cr, Cb. Then, even if at least one of the differences for Y, Cr, Cb is higher in level than the stillness determination threshold level, "1" is returned and if all of the differences are not higher than the stillness determination level, then "0" is returned (step SB2).

The above process is performed for the side panel area and the value is integrated by counting the result (step SB3). When the output integrated value is not larger than a certain threshold value, it is determined that the side panel area is a still picture (step SB4). If the above determination id continues made over a plurality of fields for a period of time longer than a certain time period, it is determined that a side panel exists and the input signal is an SD up-convert signal (step SB5) and then the average calculation process is set into the ON state (step SB6). In the other cases, the average calculation process is set in the OFF state (step SB7).

Figure 6:
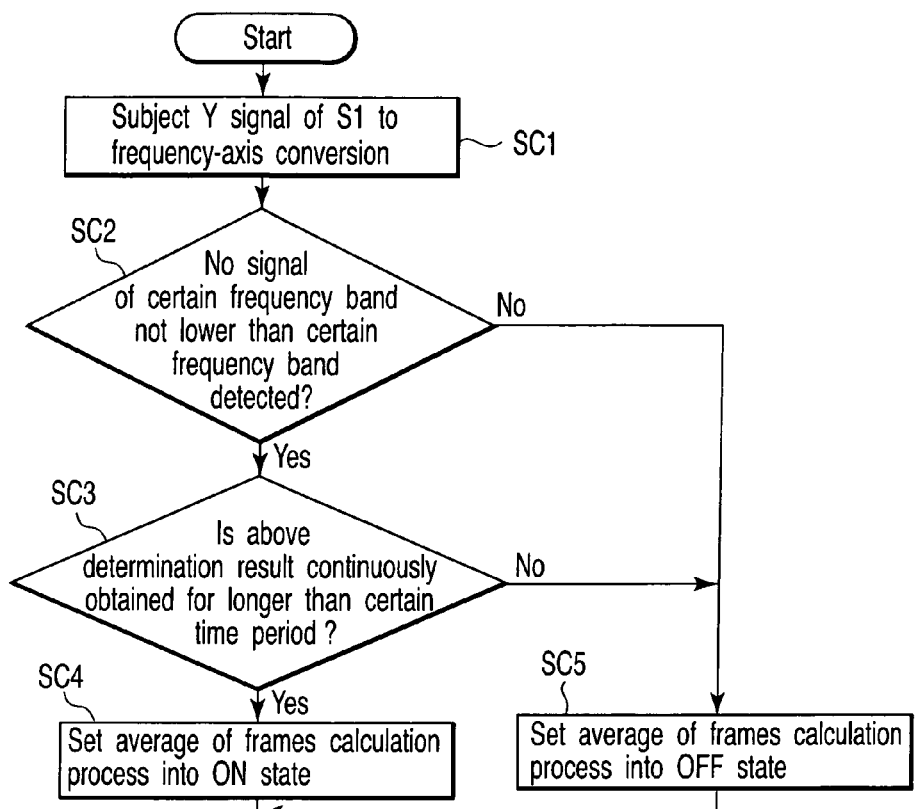
FIG. 6 is a flowchart for illustrating still another example of a determination processing operation of an SD up-convert signal applied to the invention.

FIG. 6 shows a third embodiment of the SD up-convert signal detection process. The process is attained by performing the input Y signal frequency band detecting operation based on the energy distribution on the frequency axis of a signal on the screen. First, the input signal S1 is subjected to frequency-axis conversion (step SC1). A certain frequency value is set in a region higher than the limited signal band of the SD signal and whether or not a signal of a value which is equal to or larger than the above threshold value is absent in the data after conversion (the frequency band of the SD signal is low) is determined (step SC2). If "YES" in the above determination process continues over a plurality of fields for longer than a certain period of time (step SC3), it is determined that the input signal is an SD up-convert signal and the average calculation process is set in the ON state (step SC4). In the other cases, the average calculation process is set in the OFF state (step SC5).

Figure 7:
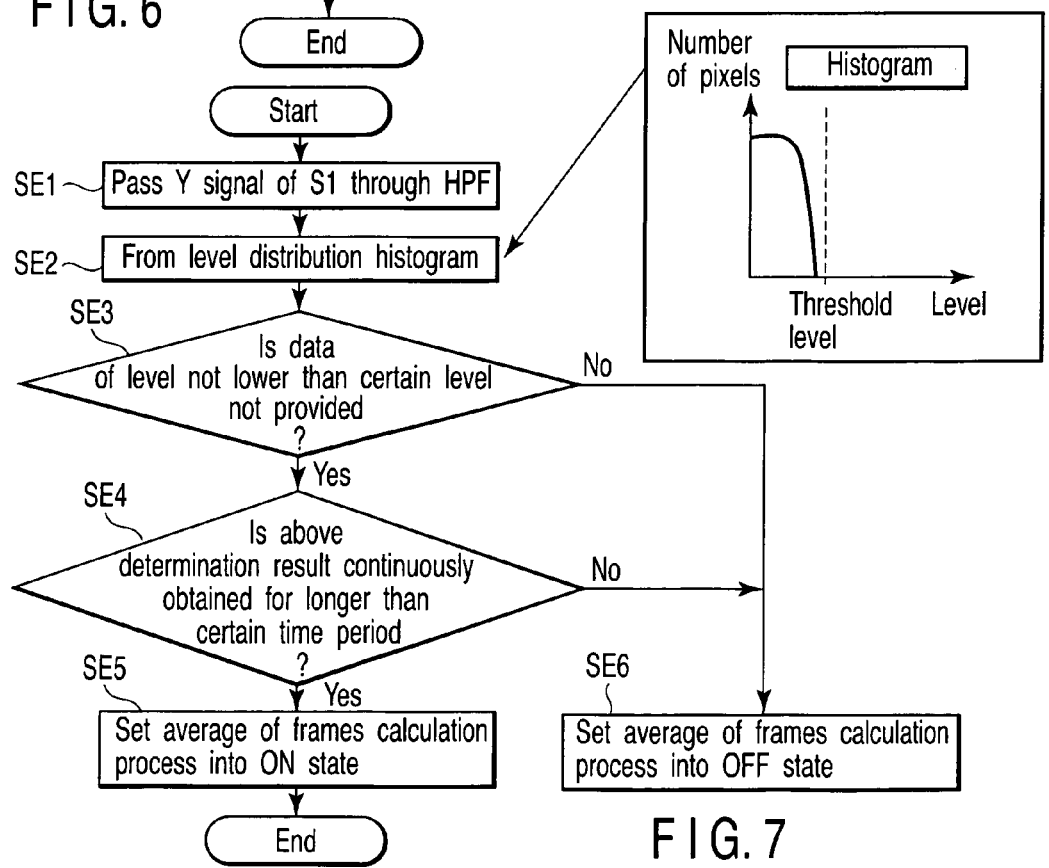
FIG. 7 is a flowchart for illustrating another example of a determination processing operation of an SD up-convert signal applied to the invention.

FIG. 7 shows a fourth embodiment of the SD up-convert signal detection process. The process is to pass a signal on the screen through an HPF (high-pass filter) and then perform the level distribution detecting process for the signal after passage when the input Y signal frequency band detecting process is performed.

First, the input signal S1 is passed through an HPF in which the limited signal band is eliminated (step SE1). After this, the output levels of the filter are formed into a histogram form as shown by a graph example in FIG. 7 (step SE2).

When data after conversion is not present in a region higher than a certain level, it is determined that the input signal exists in the limited signal band and coincides with the property of the SD up-convert signal (step SE3). If "YES" in the above determination process continues over a plurality of fields for longer than a certain period of time, it is determined that the input signal is an SD up-convert signal (step SE4) and the average calculation process is set in the ON state (step SE5). In the other cases, the average calculation process is set in the OFF state (step SE6).

Figure 8:
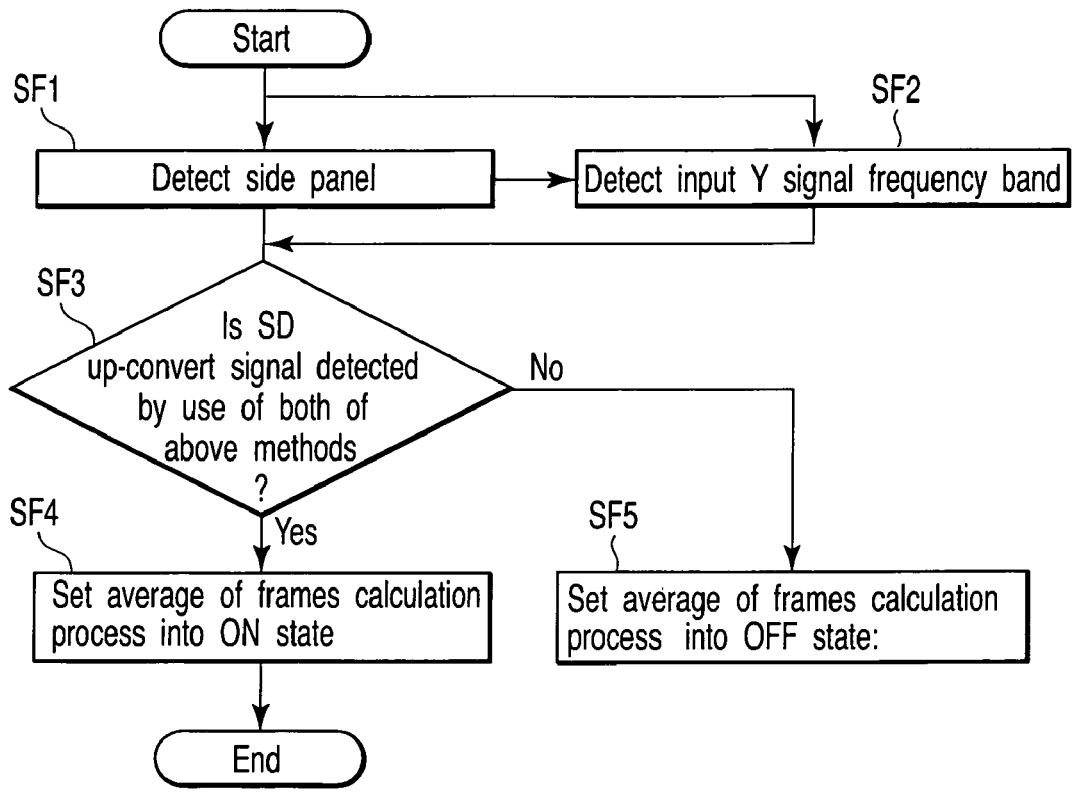
FIG. 8 is a flowchart for illustrating still another example of a determination processing operation of an SD up-convert signal applied to the invention.

FIG. 8 shows a fifth embodiment of the SD up-convert signal detection process. The process is to perform both of the side panel detection process and the input Y signal frequency band detection process. Only when it is determined that the input signal is an SD up-convert signal in each of the above cases, it is determined that the input signal is an SD up-convert signal and the average calculation process is set in the ON state. The step SF1 corresponds to the contents of FIG. 4 or 5 and the step SF2 corresponds to the contents of FIG. 6 or 7. When a determination output indicating that an SD up-convert signal is input is obtained based on the steps SF1, SF2 (step SF3), the average calculation process is set in the ON state (step SF4). In the other cases, the average calculation process is set in the OFF state (step SF5). The processing path for the color-difference signal (color signal) and luminance signal in the circuit of this invention may be configured in a parallel form or may be configured to process the signals in a time sharing fashion. Both of the above cases are contained in the technical scope of this invention. Further, in the above explanation, a signal whose resolution is lower than the resolution of the HD signal is dealt with as an SD signal, but various signals other than the SD signal may be provided. For example, various sources of, for example, a moving picture signal, still picture signal and a signal obtained by converting a conventional movie of 24 frames into a video signal are provided. Therefore, the SD up-convert signal detecting circuit 04 is not always limited to a circuit which determines whether the SD signal is up-converted or not. That is, it may be any type of circuit which can determine whether a signal whose resolution is lower than the resolution of the HD signal is up-converted or not.

Thus, according to this invention, cross color and dot disturbances which tend to often occur in a program in which the SD signal is up-converted into the HD signal can be eliminated. Particularly, the invention is effective for adaptive noise reduction with respect to a mixed signal of a pure HD signal and a signal obtained by up-converting the SD signal into an HD signal.

By the above means, an adequate cross color and dot disturbance eliminating operation can be attained when a signal in which cross color and dot disturbances tend to often occur arrives.

While certain embodiments of the invention have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

What is claimed is:

1. A cross color and dot disturbance eliminating apparatus, comprising:
an average of frames calculation processing portion which performs an average calculation process for frames by use of an input signal and a one-frame delay signal and obtains an output signal having cross color and dot disturbance components reduced; and
an up-convert signal detecting portion which sets the average of frames calculation processing portion into an operative state when the input signal is an up-convert signal obtained by up-converting a signal of a first resolution into a signal of a second resolution which is higher than the first resolution,
wherein the up-convert signal detecting portion is configured to perform a side panel detecting process which uses a result of a process of determining whether a black level of a luminance signal of a side panel area is present.

2. The cross color and dot disturbance eliminating apparatus according to claim 1, wherein the up-convert signal detecting portion is configured to perform a side panel detecting process which further uses a result of determination representing whether a color signal and luminance signal of a side panel area indicate a uniform still picture for a certain continuous period of time.

3. The cross color and dot disturbance eliminating apparatus according to claim 1, wherein the up-convert signal detecting portion is configured to perform an input luminance signal frequency band detecting process which uses a result of detecting energy distribution on a frequency axis of a signal for a screen.

4. The cross color and dot disturbance eliminating apparatus according to claim 1, wherein the up-convert signal detecting portion is configured to perform an input luminance signal frequency band detecting process which uses a result of detection of a passing signal for a screen through a high-pass filter (HPF) and detecting level distribution of an HPF output signal.

5. A cross color and dot disturbance eliminating method which controls an average of frames calculation processing portion to perform an average calculation process for frames by use of an input signal and a one-frame delay signal and to acquire an output signal having cross color and dot disturbance components reduced, comprising:
    determining whether the input signal is an up-convert signal obtained by up-converting a signal of a first resolution into a signal of a second resolution which is higher than the first resolution; and
    setting the average of frames calculation processing portion into an operative state when the determination result indicates the up-convert signal,
    wherein a determining process which determines whether the input signal is the up-convert signal determines whether a black level of a luminance signal of a side panel area is present, integrates a result of determination indicating that black level is not present, and determines that a side panel of the black level is present when an integrated value not larger than a preset value is continuously obtained for a period of time longer than a preset time period and sets an average calculation process into an ON state.

6. The cross color and dot disturbance eliminating method according to claim 5, wherein the determining process which determines whether the input signal is the up-convert signal further includes:
    holding values obtained based on averages of a luminance signal Y and color-difference signals Cr, Cb in a side panel area of an input signal S1,
    reading the averages of an immediately preceding field and respectively calculating differences between the averages and the input signal S1 for the luminance signal Y and color-difference signals Cr, Cb,
    setting "1" when at least one of the differences for Y, Cr, Cb is higher than a stillness determination threshold level and setting "0" when all of the differences are not higher than the stillness determination threshold level,
    acquiring an integrated value by counting "1" in the side panel area,
    determining that the side panel is a still picture when the integrated value is not larger than a preset threshold value, and
    determining that a side panel exists and the input signal is an SD up-convert signal when the still picture determination operation is continuously performed over a plurality of fields for a period of time longer than a certain time period and setting an average calculating process into an ON state.

7. The cross color and dot disturbance eliminating method according to claim 5, wherein the determining process which determines whether the input signal is the up-convert signal further includes:
    subjecting the input signal to frequency-axis conversion,
    determining that a signal of a frequency not lower than a certain frequency does not exist in a signal obtained after the frequency-axis conversion, and
    determining that the input signal is an up-convert signal when the above determination operation is continuously performed for a period of time longer than a certain time period and setting an average calculation process into an ON state.

8. The cross color and dot disturbance eliminating method according to claim 5, wherein the determining process which determines whether the input signal is the up-convert signal further includes:
    passing the input signal through a high-pass filter which eliminates a preset limited signal band,
    forming levels of an output of the high-pass filter into a histogram form,
    determining that the input signal coincides with a property of an up-convert signal when data of the histogram of a level not lower than a preset level does not exist, and
    determining that the input signal is an up-convert signal when the above determination operation is continuously performed for a period of time longer than a certain time period and setting an average calculation process into an ON state.

* * * * *